United States Patent Office 3,231,408
Patented Jan. 25, 1966

3,231,408
NUCLEAR FUEL MATERIALS
Roy Alfred Ulfketel Huddle, Crescent, Dorchester, England, assignor to United Kingdom Atomic Energy Authority, London, England
No Drawing. Filed Mar. 30, 1960, Ser. No. 18,506
Claims priority, application Great Britain Mar. 31, 1959
The portion of the term of the patent subsequent to Jan. 17, 1982, has been disclaimed
5 Claims. (Cl. 117—46)

This invention relates to nuclear fuel material and is concerned with a process for manufacturing such fuel material in the form of a graphite body intimately embodying a small proportion of a fissile or fertile material. Fissile or fertile material will hereinafter be referred to as nuclear fuel material.

According to the present invention a process for manufacturing a nuclear fuel material comprises contacting particles of a carbide of a nuclear fuel metal with a hydrocarbon gas at a temperature above that at which carbon is deposited pyrolytically on the surface of the particles and below that at which excessive gas phase polymerisation takes place.

A preferred hydrocarbon gas is propane for which the minimum temperature at which pyrolytic deposition will take place at the surface of the particles at a practical rate is about 775° C. Another suitable gas is benzene. The maximum temperature depends on how much polymerisation of the gas can be tolerated in any particular apparatus without the apparatus becoming choked with polymer products. In this specification "excessive" gas phase polymerisation is used to mean that amount which interferes with the efficient operation of any particular contacting apparatus. Using propane in the particular experimental apparatus hereinafter described by way of example, the polymerisation becomes excessive at about 900° C.

Contacting may be effected in any known way such as in a fluidised bed or in a tumbler vessel capable of being heated to the reacting temperature.

It may be convenient and advantageous as a preliminary process to convert particles of a nuclear fuel metal to carbide particles in the same vessel or bed as the pyrolytic deposition is carried out in which case the hydrocarbon gas may be present to prevent oxidation of the metal until the carburising temperature is reached.

The graphite coated carbide particles produced by the process of the invention may be used per se as a nuclear fuel contained in graphite or other suitable low neutron absorbing containers or alternatively they may be compacted into artifacts such as sleeves, discs or rods with the aid of a binder or carrier material such as ultra fine graphite powder.

Contacting of the metal or carbide particles with the hydrocarbon gas may be effected in any suitable known apparatus. In the following examples of processes according to the invention contacting has been effected by tumbling a quantity of the particles in a tubular graphite vessel adapted to be rotated with an electric furnace and having connections with rotating seals at each end for the through flow of gas. The particular vessel used in the experiments was about 3 cm. internal diameter and 15 cm. long. The inner surface was provided with longitudinal flutes to assist the tumbling action which was performed at about 14 revolutions per minute. The weight of the charge was 30–40 gm.

*Example I*

A quantity of calcium reduced uranium metal powder was sieved and a fraction selected which passed through British standard sieve No. 140 but was retained by sieve No. 325.

The selected fraction was cleaned in nitric acid, washed in water followed by acetone and dried.

About 35 gm. of the powder so prepared was charged into the above described tumbler vessel and the vessel installed in the furnace and connected to a supply of commercial propane. The gas regulator was adjusted to give a flow rate of about 4 to 5 cc. per second and the vessel rotated at about 14 revolutions per minute.

The furnace was then switched on and the temperature rose to about 700° C. in 2 to 2½ hours, which temperature was held for about 2 hours when substantially the whole of the charge had been converted to uranium carbide.

The temperature was then further raised to about 850° C. and maintained at that temperature for 48 hours during which time carbon was deposited pyroltically on the particles of carbide.

After cooling the charge was examined by X-ray photography and was found to consist of uranium carbide particles coated with graphite. Each particle contained by weight about 36% of free carbon and 3% combined as carbide, the remainder being uranium combined as carbide, there being no free uranium. The particle density was about 6.1 gm. per cc.

*Example II*

A quantity of uranium metal swarf was cleaned in nitric acid, washed in water followed by acetone and dried.

The cleaned and dried metal swarf was placed in a graphite boat and heated in a vacuum furnace to about 250° C. Commercial hydrogen was then introduced into the furnace until after about an hour all the metal had combined to form the hydride.

The furnace was then again evacuated and the temperature raised to 480° C. until the hydride had all decomposed to form a finely divided metallic uranium powder. The temperature was then raised to 500° C., propane introduced and the temperature further raised to 700° C. where it was held for 3 hours until the charge had been converted to powdered uranium carbide. This carbide was then sieved in the same way as the powdered uranium metal of Example I and the selected fraction charged into the tumbler vessel above decribed.

The process of Example I, commencing at the point where the uranium carbide had been formed, was then applied by heating the vessel to 850° C. and holding this temperature for 48 hours, while tumbling the contents in a stream of propane.

After cooling the charge was examined by X-ray photography and the uranium carbide particles were found to be slightly more heavily coated with graphite than the particles of Example I. Each particle contained by weight about 44% free carbon and 3% combined as carbide, the remainder being uranium combined as carbide, there being no free uranium. The particle density was about 4.2 gm. per cc.

It is believed that the different weight percentage of free carbon and the corresponding density difference in the two examples is due to a difference in the mean particle size of the uranium carbide particles on which the carbon was deposited.

Much heavier coating may be produced by prolonging the period of deposition and/or increasing the temperature having due regard to the effect of the gas phase polymerisation. Thus the proportion of nuclear fuel material relative to the amount of graphite in the final product can be regulated according to the thickness of the final coating and also according to the amount of binder used if, as in the next example, the coated particles are to be compacted into artifacts.

Example III

The coated carbide product of Examples I and II were each mixed with an ultra fine graphite powder (DAG 621 manufactured by Achesons) in the weight ratio of one to nine respectively and the mixtures cold compacted in dies at a pressure of 21.5 tons per sq. in. to form cylindrical sleeve ½ in. outside diameter and ¼ in. inside diameter by ½ in long.

An advantage of the invention is that each carbide particle is coated with graphite which is molecularly orientated so as to minimise the escape of fission products.

I claim:

1. A process for manufacturing nuclear fuel material comprising contacting particles of a carbide of a nuclear fuel metal with a hydrocarbon gas at a temperature above that at which carbon is deposited pyrolytically on the surface of the particles and below that at which excessive gas phase polymerisation takes place.

2. A process as claimed in claim 1 wherein the gas is propane and the temperature range is 775 to 900° C.

3. A process for manufacturing nuclear fuel material comprising tumbling particles of a carbide of nuclear fuel metal in a vessel containing a hydrocarbon gas, passing said gas continuously through said vessel, and heating said gas to a temperature in a range in which carbon is deposited pyrolytically on the surface of said particles and in which excessive gas phase polymerisation of said gas does not take place.

4. A process for manufacturing nuclear fuel material comprising first contacting particles of a nuclear fuel metal with a hydrocarbon gas at a first temperature at which carburizing of the particles to convert them to the carbide of said metal occurs and then contacting said particles with said gas at a temperature higher than said first temperature and in a range in which carbon is deposited pyrolytically from said gas on the surface of said particles and in which excessive gas phase polymerisation of said gas does not take place.

5. A process as claimed in claim 4 wherein the gas is propane, said first temperature is about 700° C. and said higher temperature is in the range 755° to 900° C.

References Cited in the file of this patent

UNITED STATES PATENTS

| 1,025,469 | 5/1912 | Hunter. |
| 2,328,422 | 8/1943 | Christensen. |
| 2,392,682 | 1/1946 | Marek. |
| 3,010,889 | 11/1961 | Fortescue et al. |

FOREIGN PATENTS

| 1,037,605 | 8/1958 | Germany. |

OTHER REFERENCES

Nucleonics, volume 14, No. 3, March 1956, pages 35 and 36.